UNITED STATES PATENT OFFICE.

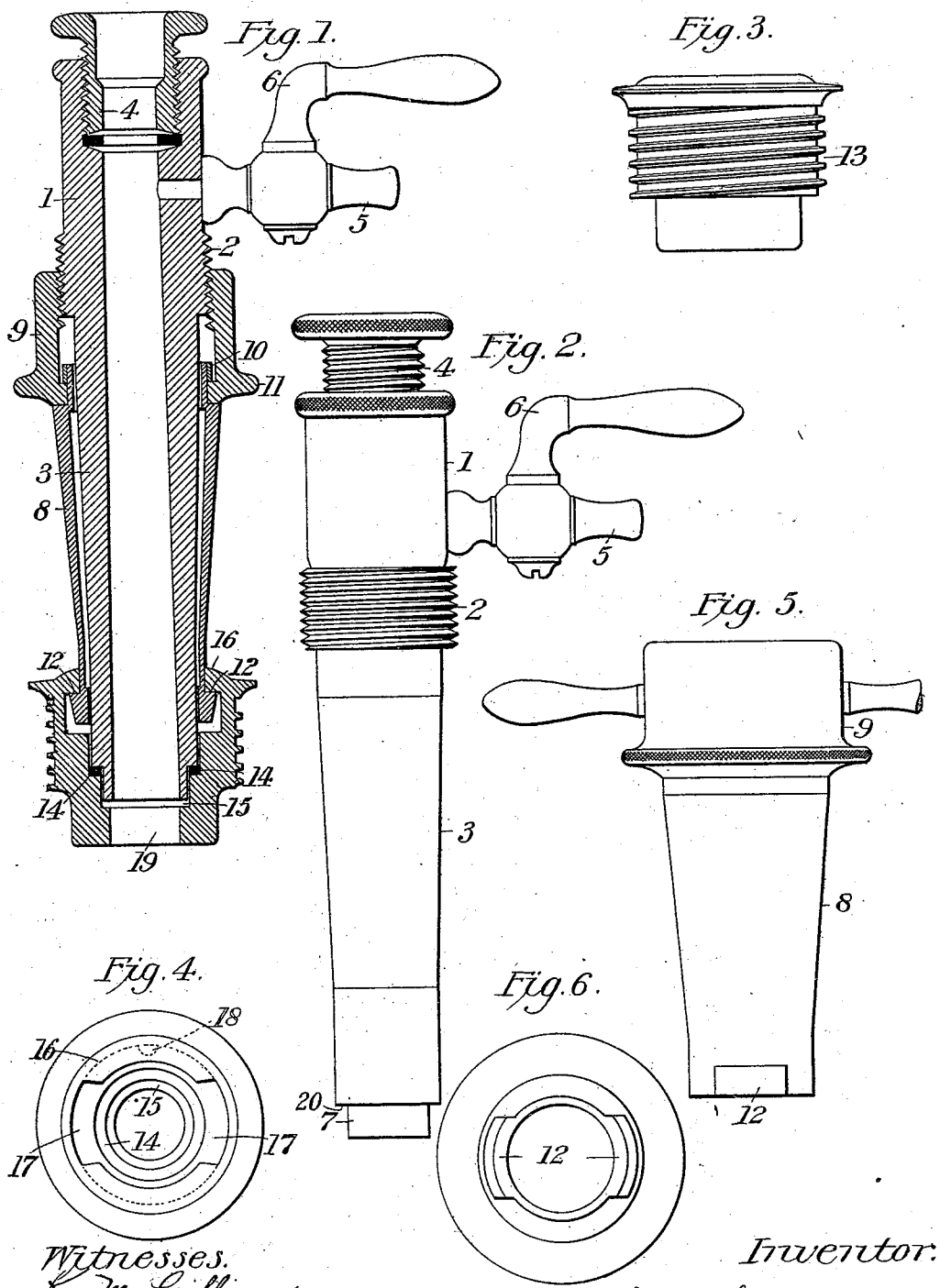

JACOB GROSS, OF PHILADELPHIA, PENNSYLVANIA.

BEER-SPIGOT.

SPECIFICATION forming part of Letters Patent No. 549,637, dated November 12, 1895.

Application filed March 7, 1895. Serial No. 540,830. (No model.)

*To all whom it may concern:*

Be it known that I, JACOB GROSS, a citizen of the United States, residing at the city of Philadelphia, in the county of Philadelphia and State of Pennsylvania, have invented certain new and useful Improvements in Beer-Spigots, of which the following is a specification.

One object of my invention is to provide a simple, durable, attractive, and comparatively inexpensive beer-spigot that may be readily and firmly attached to and disconnected from a bung adapted for its reception without turning or otherwise interfering with the connections that lead to the bar-fixtures and to the supply of compressed air and that may be applied to or driven in the hole that is commonly provided in the heads or curved surfaces of beer-kegs without the employment of a bung-fitting.

Another object of my invention is to insure a free passage for the ingress of air between the interior of the spigot and the pipe that penetrates it and affords an offtake from the keg or barrel.

My invention consists of the improvements hereinafter described and claimed, and its nature, objects, and scope will be more fully understood from the following description, taken in connection with the accompanying drawings, forming part hereof, and in which—

Figure 1 is a central sectional view of a complete beer-spigot embodying features of my invention. Fig. 2 is an elevational view of a tubular casing forming part of my improved spigot and provided at its top with a stuffing-box, at its side with an air-inlet, upon its surface with a thread, and upon its lower end with a depending flange. Fig. 3 is a side elevational view of the bung that is secured in the bung-hole. Fig. 4 is a top or plan view of the bung, showing the same provided with lips and slots. Fig. 5 is an elevational view of a sleeve provided with lugs adapted for insertion through the slots and for engagement with the lips of the bung and with a revoluble nut adapted for engagement with the threaded portion of the tubular casing shown in Fig. 2, and Fig. 6 is a plan view of the under side of the sleeve shown in Fig. 5.

In the drawings, 1 is a tubular casing provided with an external thread 2 and preferably tapered, as at 3, so that it may be applied to a keg or barrel that is provided with an ordinary bung-hole and not with the bung illustrated in Figs. 3 and 4 and hereinafter more fully described. This tubular casing is provided at its upper end with a stuffing-box 4, which is used for making a tight joint between the tubular casing 3 and the pipe (not shown) that leads to the bar-fittings and passes through the tubular casing into the interior of the keg or barrel.

Below the stuffing-box 4 is an air-inlet 5, that may be provided with a stop-cock 6 and that is connected by means of a rubber hose or otherwise with a supply of compressed air that passes between the inner walls of the tubular casing 3 and the outer walls of the pipe that passes through it and leads to the bar-fittings. At its lower end this tubular casing 3 is provided with a flange 7, for a purpose to be presently described.

8 is a sleeve having at its upper end a revoluble nut 9, held against end play—for example, by means of a collar 10, Fig. 1—and adapted for engagement with the thread 2 upon the tubular casing 3. This nut may be milled, as at 11, Fig. 1, or provided with handles, as shown in Fig. 5, for the convenience of the operator in turning it. The lower portion of the sleeve 8 is provided with projecting lugs 12, for purposes to be more fully explained.

The bung 13 is externally threaded or otherwise adapted for application to the bung-hole of a keg or barrel. Internally the bung 13 is provided with two seats 14 and 15, whereof the seat 14 supports a washer or gasket and whereof the seat 15 accommodates the flange 7, depending from the tubular casing 3, the object being to prevent the gasket or washer from being expanded so as to collide with the pipe that penetrates the tubular casing 3 and leads to the contents of the keg or barrel, and this object is accomplished because the sleeve 7 depends in front of the washer, as shown in Fig. 1, and thus prevents undue lateral expansion thereof. The upper portion of the bung 13 is provided with lips 16 and slots 17, and the lugs 12 of the sleeve 8 are adapted to be passed through the slots 17 and then brought by a slight rotation of the sleeve 8 under the lips 16. As shown in the drawings, Fig. 4, a stop-pin 18 is provided for limiting the travel of the lugs 12.

The mode of operation of the hereinabove-described beer-spigot is as follows: The sleeve 8 is assumed to be in its normal position with its nut 9 in engagement with the thread 2 of the tubular casing 3, and the opening 19 in the bung 13 is assumed to be closed in the ordinary manner by means of a cork. The lower ends of the sleeve and tubular casing are then applied to the bung 13, as shown in Fig. 1, for which purpose the lugs 12 are first inserted through the slots 17 and then brought beneath the lips 16 by slightly turning the sleeve 8. The nut 9 is then screwed up onto the thread 12, whereby the seat 20 at the end of the tubular sleeve is drawn or forced down onto the washer or gasket, as shown in Fig. 1, while at the same time the flange 7 prevents the gasket or washer from being expanded laterally so as to interfere with the ingress of air, as has been already explained.

From the foregoing description it will be apparent that an air-tight joint is provided between the bung and the tubular casing and that the sleeve 8 firmly holds the tubular casing 3 to place, so that it cannot be blown out of the keg or barrel by any pressure that may exist therein.

It will of course be understood that the pipe which leads from the bar-fixtures through the spigot to the keg affords means for knocking the cork out of the bung and that a tight joint between this pipe and the spigot is provided by means of the stuffing-box 4.

Among the advantages of the above-described beer-spigot the following may be mentioned: First, by removing the sleeve 8 the tubular casing may be driven into the ordinary bung-hole of a barrel, and, second, the tubular casing may be applied to the bung without turning it, whereby injury to the pipe connections that communicate with the air-inlet 5 and with the interior of the beer-barrel is obviated, because they need not be disturbed and are not subjected to accidental breakage.

It will be obvious to those skilled in the art to which my invention relates that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A beer spigot comprising the combination of, a thread cut or otherwise formed upon the exterior of a tubular casing having at its end a transversely ranging seat, as 20, a bung provided with slots and inwardly projecting lips and with a transversely ranging seat, as 14, a flat gasket or washer interposed between said seats, a sleeve mounted around said casing and having lugs adapted to penetrate said slots and engage said lips, and a nut revolubly connected with said sleeve and adapted to detachably engage the thread on the tubular casing, substantially as described.

2. A beer spigot comprising the combination of, a sleeve and bung having interlocking lips and lugs, and corresponding flat seats, a tubular casing provided with an external thread, and a revoluble nut held against end play on said sleeve and adapted to detachably engage said thread, substantially as described.

In testimony whereof I have hereunto signed my name in the presence of two witnesses.

JACOB GROSS.

Witnesses:
WM. H. EMHARDT, Jr.,
CHARLES H. WEISS.